Nov. 27, 1934.   G. E. WHEELER   1,982,363
ADJUSTABLE SPINDLE COUPLING
Filed Feb. 23, 1932

Inventor
GLENN E. WHEELER.
By Richey & Watts
Attorney

Patented Nov. 27, 1934

1,982,363

UNITED STATES PATENT OFFICE 1,982,363

ADJUSTABLE SPINDLE COUPLING

Glenn E. Wheeler, Buffalo, N. Y., assignor to Republic Steel Corporation, Youngstown, Ohio, a corporation of New Jersey Application February 23, 1932, Serial No. 594,509

14 Claims. (Cl. 80—24)

This invention relates to coupling devices for transmitting power or motion from a driving to a driven member and which are adjustable to vary the angular relationship of the driving and driven members about their axis.

It is among the objects of this invention to provide a coupling for use between a pinion stand and the rolls of a die roll mill which connections can readily be adjusted to give and maintain a constant angular velocity ratio of the rolls and which include mechanism for obtaining relative circumferential adjustment of the die rolls for the purpose of matching their matrices and at the same time maintaining said constant angular velocity ratio. It is a further object of this invention to provide a coupling which has the minimum of adjustable parts and which can be easily and accurately adjusted, and can be adjusted the maximum amount namely a full revolution of the die roll. It is a still further object of this invention to provide a coupling which is simple of design, and relatively small in comparison with the shafting and yet is strong and rugged of construction and in which the parts are so formed as to offer the maximum resistance to crushing loads.

Other objects and advantageous features, more or less ancillary to the foregoing and the manner in which all the various objects are realized will appear in the following detailed description, which, considered in conjunction with the accompanying drawing, sets forth the preferred embodiment of the invention and wherein.

Figure 1:
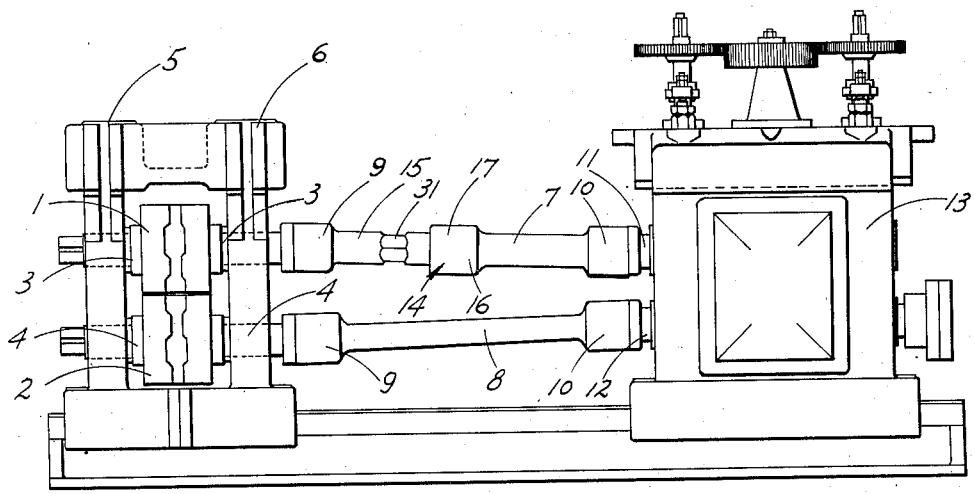
Figure 1 is an elevational view of an organized apparatus embodying my invention; the apparatus including a mill provided with a pair of die rolls, a pinion stand, and driving connections between the stand of pinions and the die rolls.

With reference to the drawing and particularly Figure 1 there is illustrated the upper and lower rolls 1 and 2 respectively of a two high die rolling mill. The rolls 1 and 2 are provided with necks or shafts 3 and 4 on each side thereof, and these are journalled within suitable bearings mounted in windows in the housings 5 and 6 respectively, in the usual manner. The ends of the necks 3 and 4 are connected to spindles 7 and 8 respectively through universal joints or coupling members 9. The opposite ends of the spindles 7 and 8 are connected through similar universal joints or couplings 10, to the necks or shafts 11 and 12 of pinions disposed in a pinion stand which is designated in its entirety by the numeral 13.

Disposed intermediate the ends of the spindle 7 is my improved coupling member designated in its entirety by the numeral 14 and comprising two members 15 and 16. The member 16 of the spindle 7 is formed with an enlarged cylindrical sleeve 17 which is internally bored as at 18 and threaded as at 19. The bore 18 has an extension 20 thereof of a reduced diameter. Extending diametrically through the enlarged sleeve 17 of the shaft 16 and intersecting the bore 20 of reduced diameter is an aperture 21. This aperture 21 is adapted to receive adjusting bolt 22 having a threaded portion thereof positioned within the bore 20. Heads 22a are rigidly fixed on the opposing ends of the bolt 22 and are adapted to rotate therewith. The sleeve 17 is suitably recessed or countersunk adjacent each end of the aperture 21 to receive the heads 22a disposed on the ends of adjusting bolt 22.

Figure 2:
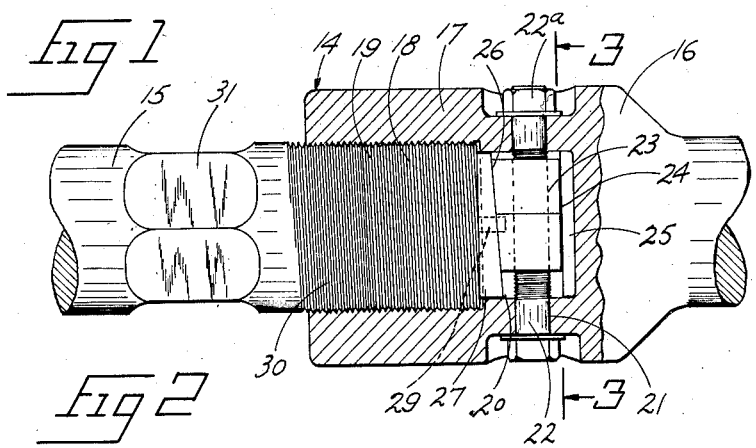
Figure 2 is a sectional view of an adjustable coupling for use in the driving connections or spindle between the pinion stand and the die roll stand and embodying my invention.
Figure 3:
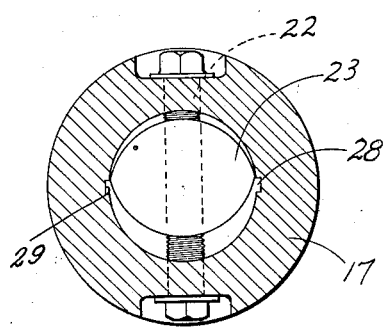
Figure 3 is a sectional view taken along the line 3—3 of Figure 2.

On the threaded portion of the bolt 22 within the bore 20 is disposed a wedge 23. This wedge member is of a somewhat elliptical form and is suitably threaded so as to move axially of the adjusting bolt 22 when the same is rotated within the bore 20. As is shown in Figure 2 the wedge member 23 is provided with a flat face 24 which abuts against the outer surface of an annular bearing member 25 disposed at the end of the bore or cavity 20. The opposing face 26 of the wedge member 23 is angularly disposed and coacts with a complemental face on the annular bearing member 27. The bearing 27 has formed integrally thereon diametrically extending projections 28 which engage in longitudinally extending slots 29 formed in the interior walls of the bore 20, such construction precluding any rotational movement of the bearing member within the enlarged sleeve 17 of the member 16. The slots are of sufficient length to permit limited axial movement of the bearing relative to the spindle.

The member 15 of the spindle 7 is externally threaded as at 30 and is received by the internally threaded bore 18. The end of the member 15 is adapted to abut against the flat or outer face of the bearing member 27 disposed in the bore 20. A wrench receiving portion 31 is provided to facilitate the axial adjustment of the opposing ends of the spindle.

In assembling the coupling the member 15 of the spindle is inserted into the threaded bore of the enlarged sleeve 17 of the member 16; the end of the threaded shaft abutting against the outer face of the bearing member 27. The matrices on the rolls 1 and 2 are then properly aligned and the bolt 22 is rotated through one of the heads 22a thereon. The wedge member is thus moved axially of the adjusting bolt 22 to securely clamp the bearing member 27 against the end of threaded shaft. The threads on the shaft are right hand threads if the spindle is rotated clockwise, and left hand if the rotation is counter clockwise so that as the spindle is rotated the shaft has a tendency to become more securely fixed in the bore 18, which is precluded by the positioning of the bearing 27 through the adjustable wedge member 23. The end of the bore 20 and the end of the threaded shaft act as opposing abutments between which the wedge members act prohibiting further movement of the abutments toward each other when the wedge member is finally adjusted.

It will be seen, therefore, that I have provided a coupling which is simple of construction, having a more rapid and greater range of adjustability than couplings now in use for similar purposes through its single point of adjustment. Furthermore, a coupling is provided which is rugged enough to withstand any abuse to which it might be put and yet is not much larger than the spindle itself.

Although the foregoing description is necessarily of a detailed character in order to completely set forth this invention it is to be understood that the specific terminology is not intended to be restrictive or confining and it is further understood that various rearrangements of parts and modifications of structural detail may be resorted to without departing from the scope or spirit of the invention as herein claimed.

I claim:

1. In a die rolling mill including a pair of die rolls, a spindle for driving one of said rolls, means carried by said spindle for effecting a circumferential adjustment between said die rolls, said means comprising threaded members having abutments thereon, and adjustable means disposed intermediate said threaded members for precluding axial movement of said abutments toward each other.

2. In a die rolling mill including a pair of die rolls, a spindle for driving one of said rolls, means carried by said spindle for effecting a circumferential adjustment between said rolls, said means comprising male and female threaded members having axially spaced abutments thereon, and an adjustable wedge member for precluding axial movement of said abutments toward each other.

3. In a die rolling mill including a pair of die rolls, a spindle for driving one of said rolls, means for effecting a circumferential adjustment between said rolls, said means comprising interengaged male and female threaded members having spaced abutments thereon, a wedge member for precluding axial movement of said abutments toward each other, and means for adjusting said wedge member.

4. In a die rolling mill including co-acting die rolls, a spindle for driving one of said rolls, said spindle embodying means for effecting circumferential adjustment between said die rolls, said means including a threaded portion on said spindle, a threaded sleeve adapted to receive said threaded portion, and adjustable wedge means adapted to engage the end of said threaded portion for precluding relative movement between said threaded portion and sleeve in one direction only.

5. In a die rolling mill including co-acting die rolls, a spindle for driving one of said rolls, said spindle embodying means for effecting circumferential adjustment between said die rolls, said means comprising a threaded portion on said spindle, a threaded sleeve adapted to receive said threaded shaft, and an adjustable wedge member disposed between the end of said threaded portion and the end of said sleeve.

6. In a die rolling mill including co-acting die rolls, a spindle for driving one of said rolls, said spindle embodying means for effecting circumferential adjustment between said die rolls, said means comprising a threaded portion on said spindle, a threaded sleeve having a portion adapted to receive said threaded portion, said sleeve having a portion of reduced internal diameter, and an adjustable wedge member disposed within the portion of said sleeve of reduced diameter.

7. In a die rolling mill including co-acting die rolls, a spindle for driving one of said rolls, said spindle embodying means for effecting circumferential adjustment between said die rolls, said means comprising a threaded portion on said spindle, a threaded sleeve adapted to receive said threaded portion, a wedge member disposed intermediate said threaded portion and the base of said sleeve, and means for effecting adjustment to said wedge member.

8. In a die rolling mill including co-acting die rolls, a spindle for driving one of said die rolls, said spindle embodying means for effecting circumferential adjustment between said die rolls, said means comprising a threaded portion on said spindle, a sleeve adapted to receive said threaded portion, a wedge member disposed within said sleeve, a bearing plate keyed within said sleeve and adapted to engage the end of said threaded portion and co-act with said wedge member.

9. In a die rolling mill including co-acting die rolls, a spindle for driving one of said rolls, said spindle embodying means for effecting circumferential adjustment between said die rolls, said means including a threaded portion on said spindle, a threaded sleeve adapted to receive the end of said threaded portion and co-act with said wedge member, and means for moving said wedge radially of said sleeve.

10. In a die rolling mill including co-acting die rolls, a spindle for driving one of said rolls, said spindle embodying means for effecting circumferential adjustment between said die rolls, said means comprising a threaded portion on said spindle, a threaded sleeve adapted to receive said threaded portion, an adjustable wedge member disposed intermediate the end of said threaded portion and the base of said sleeve and means for moving said wedge member radially of said sleeve.

11. An adjustable coupling comprising engaging male and female threaded members, an adjustable wedge member positioned between the end of the male member and the bottom of the opening in the female member and a rotatable member extending transversely of the coupling and having threaded engagement with said wedge member.

12. An adjustable coupling comprising engaging male and female threaded members, an adjustable member positioned between the end of the male member and the bottom of the opening in the female member and a rotatable member extending transversely of the coupling having threaded engagement with said wedge member for adjusting the same relative to the said male and female members.

13. An adjustable coupling comprising interengaging threaded, male and female members, abutments formed on the members in spaced relation, an adjustable wedge means positioned between the abutments and adapted to control the relation of the male and female members and a rotatable member extending transversely of the coupling having threaded engagement with said wedge member, rotation of said rotatable member causing adjustment of the wedge member relative to said abutments.

14. An adjustable coupling comprising interengaging male and female threaded members, abutments formed on the members in spaced relation, an adjustable member positioned between the abutments and adapted to control the relation of the male and female members and a rotatable member extending transversely of the coupling and having threaded engagement with said adjustable member, rotation of said rotatable member causing adjustment of said adjustable member relative to said abutments.

GLENN E. WHEELER.